W. F. HEROLD

Feb. 3, 1931. COMPENSATING CASTER, SLIDE, OR THE LIKE Re. 17,950

Original Filed April 21, 1927

INVENTOR.
WALTER F. HEROLD.
BY
Harris Mattson
ATTORNEY

Reissued Feb. 3, 1931

Re. 17,950

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

COMPENSATING CASTER, SLIDE, OR THE LIKE

Original No. 1,721,301, dated July 16, 1929, Serial No. 185,511, filed April 21, 1927. Application for reissue filed August 14, 1930. Serial No. 475,294.

The present invention relates to improvements in compensating casters, slides, or the like, an object being to provide a support for articles of furniture which will compensate for irregularities or unevenness in the floor, or in the furniture, to the end that the several points of support are at all times firmly engaged with the floor.

A principal object is to provide a device having a predetermined limit of deflection, and which will provide a rigid support when such limit is reached, so that, irrespective of the load imposed, an excess strain will not be placed upon the compensating means.

It is particularly proposed, in the present embodiment, to provide a device of this character in which the caster is adapted to have free swiveling action in any position of deflection, and which may be readily inserted and removed in the same manner as the ordinary detachable caster. Another object is to provide such a device which may be inserted in the standard drill holes provided in furniture, without change in their shape or dimensions.

A further object is to provide compensating means of very simple and inexpensive construction, that may be easily asesmbled, and which will have a resistance action proportionate to the load imposed thereon, and further in which this resistance may be varied to suit different uses by a change in the degree of inclination of one of the elements.

It is also an object to provide a device which will act as a means for absorbing vibrations and shocks, this function being especially desirable in the use of the devices on motor driven machines, as washing, refrigerating, adding machines and the like, and on delicate instruments, as radio apparatus, phonographs, dictating machines, and the like, and in this respect, it is particularly proposed, in the exemplary embodiment illustrated, to provide compensating means free from springs, or vibratory parts, that might have periodic vibrations set up in them.

With the above and other objects in view, an embodiment of the invention is shown in the accompanying drawings, and this embodiment will be hereinafter more fully described with reference thereto, and the invention will be finally pointed out in the claims.

In the drawings:—

Figure 4:
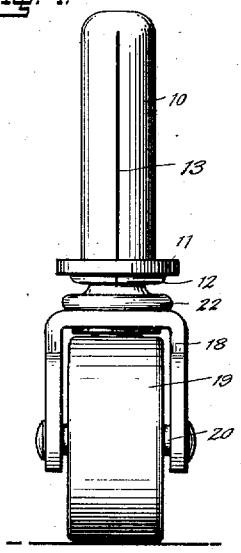
Fig. 4 is a front elevational view thereof.

Referring to the drawings, the caster, according to the present embodiment of the invention, comprises a tubular socket 10, closed at its top and provided upon its lower end with a base ring 11 secured by flanging over the lower edge of the tube, as at 12. This tube may be formed from solid drawn stock, or it may be formed from sheet metal pressed to shape and folded upon itself, in which case longitudinal seams extend at opposite sides, as shown at 13, Fig. 4. Obviously this socket is adapted to be inserted in the usual manner in the standard drill hole provided in the furniture.

Figure 5:
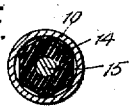
Fig. 5 is a horizontal sectional view, taken along the line 5—5 of Fig. 2.
Figure 6:
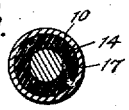
Fig. 6 is a horizontal sectional view, taken along the line 6—6 of Fig. 3.

The compensating means is inserted and retained in the upper end of the socket, and comprises a tubular plug 14, of rubber, or the like, having its outer surface of polygonal shape, hexagonal as shown in Fig. 5. Within the central passage of the plug there is engaged a top bearing plunger element comprising a cylindrical stem portion 15 slidably engaged in said passage, and an enlarged button-like base portion, having a pintle bearing bottom surface 16, and a dome-shaped peripheral surface 17 inclined inwardly to the base of the stem portion. The surface 17, it will be noted, is normally disposed beneath the bottom surface of the plug member, and as upward pressure is exerted on it, the rubber is pressed upwardly and outwardly, the hexagonal outer surface pressing outwardly against and substantially conforming to the cylindrical socket wall, as shown in Fig. 6, and as the upward pressure is increased the compression resistance of the plug is proportionately increased. Upon the limit of deflection being reached the plunger element abuts the upper end of the socket, so that further increase in the load upon the caster is directly and solidly supported, and excess strain upon the compensating means is prevented. Upon release of upward pressure the expansion of the plug element exerts a downward force upon the inclined surface of the plunger and projects it to its normal position. By increasing the inclination of the surface 17 the resistance to pressure is reduced, while decrease of the inclination will increase the resistance, and in this way the device may be designed for widely different load conditions by merely changing the plunger element. Obviously other equivalent resilient means may be employed instead of the rubber element illustrated.

Figure 1:
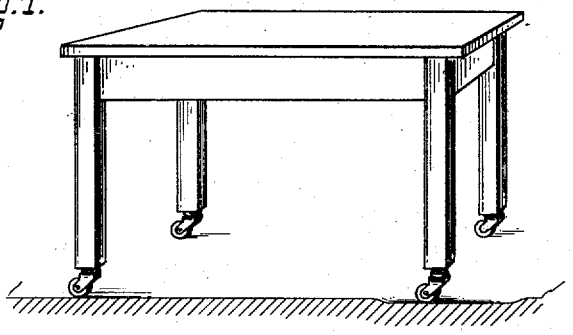
Fig. 1 is a perspective view of a table, having its four legs equipped with casters, according to the invention, and showing the cooperative relation with an uneven floor surface.
Figure 2:
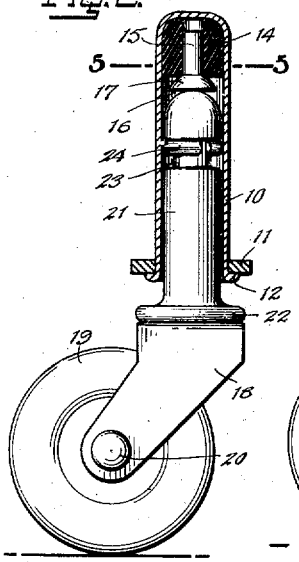
Fig. 2 is a vertical sectional view of a socket, and caster, according to the present embodiment of the invention, and showing the relation of the parts in the no-load position.
Figure 3:
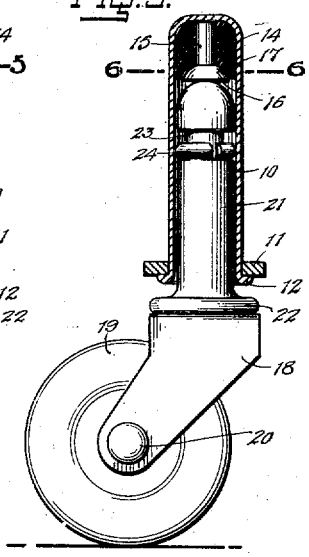
Fig. 3 is a similar view, and showing the parts in the extreme load position.

The caster comprises the usual horn 18, having a wheel 19 rotatably supported upon an axle shaft 20, and a pintle 21 secured at its lower end to the horn top, and provided adjacent said horn top with a base flange 22. The upper end of the pintle is rounded, or otherwise suitably formed to have swivel top bearing contact with the base surface 16 of the plunger element, in respect to which the pintle has relative rotary movement. An annular groove 23 is formed in the pintle in spaced relation to its upper end in which a split spring ring 24 is disposed, this ring having loose engagement in the groove in both its expanded position, when the pintle is removed from the socket, and in its contracted position within the socket, in which latter position it grips the wall of the socket to retain the pintle. The groove 23 is wider in its vertical dimension than the spring ring to an extent substantially equal to the maximum deflection of the compensating means, so that the deflection takes place through free vertical movement of the pintle, without frictional resistance from the ring, which remains in a substantially fixed position. When first inserting the pintle the ring will occupy a position against the lower wall of the groove. By then compressing the compensating means to the full limit, as shown in Fig. 3, the ring is forced upwardly, so that upon release of pressure it engages the upper wall of the groove, as shown in Fig. 2, this being the normal operative position in which it remains under any degree of deflection, thereby permitting free vertical movement of the pintle between the deflection limits, and providing an axially resilient swivel contact bearing for the pintle in all positions within said deflection limits. Under full load conditions, the parts will occupy the relative positions shown in Fig. 3, and in which the pintle has non-resilient swivel contact bearing relation independently of the resilient means. Obviously other equivalent means may be employed, within the scope of the invention, including a separately formed bearing element, with respect to which the pintle is relatively movable, and whereby the pintle has axially resilient swivel contact bearing within the deflection limits and non-resilient swivel contact bearing under full load. Should any of the points of support encounter an uneven surface the compensating means will exert an expelling action on the plunger element and the freely movable pintle, and thereby compensate for such unevenness. When there is no load on the caster, as when it is out of engagement with the floor, the resilient means is such that the parts will be held against rattling, the plug 14 yieldingly holding the upper stop wall of the pintle groove 23 snugly against the spring 24, which is substantially fixed within the socket against the pressure of the plug. Under certain conditions where it may be desired to resiliently support the furniture at all points, at the same time compensating for irregularities and unevenness, the resistance will be designed so that the load desired to be supported will not be sufficient to press the parts to the limit position, as shown in Fig. 3, but they will occupy an intermediate position in which the compensating means constitutes a cushion support, constantly exerting an expelling action to compensate for unevenness, however.

In addition to the compensating function, the device, according to the exemplary illustrated embodiment, will absorb shocks and vibrations, and without setting up periodic vibrations within itself, this being due in part to the insulating support provided by the rubber plug element, and in part to the vertical movement of the pintle without frictional resistance from the retaining ring.

Figure 9:
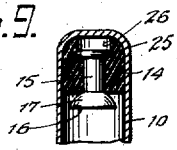
Fig. 9 is a sectional view of a modified form.
Figure 7:
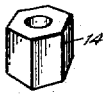
Figs. 7 and 8 are perspective views of the compensating and top bearing elements employed in the disclosed embodiment.
Figure 8:
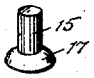

In the modified form of the invention shown in Fig. 9, the stem portion 15 of the flange element is provided at its upper end with a head 25 seated in a shouldered recess 26 in the tubular plug 14, and is adapted to limit the expelling movement of the plunger element.

Obviously a slide or other floor engaging element may be substituted for the caster wheel, and other changes made in the illustrated embodiments, without departing from the spirit and scope of the invention, as defined in the appended claims.

Having thus described my invention, what I claim and desire to secure by Letters Patent is:

1. A compensating furniture support, comprising a socket element, a floor engaging element including a pintle, a tubular compensating element of resilient material carried by said socket element, and a vertically movable top bearing element adapted to be engaged by said pintle and including a stem portion engaged in the passage of said tubular element and an enlarged base disposed beneath said tubular element and engaged by said pintle.

2. The invention as claimed in claim 1, further characterized by said enlarged base having an inclined peripheral wall engaged beneath the tubular element.

3. A compensating furniture support, comprising a socket element, a floor engaging element including a pintle, a vertically movable top bearing element adapted to be engaged by said pintle, a compensating element of resilient material, engaged by said top bearing element having its outer periphery provided with spaced portions engaging the inner wall of said socket element and forming air spaces between said spaced engaging portions to permit outward deflection of said element, said tubular element adapted to exert an expelling force on said top bearing element and said floor engaging element.

4. A compensating furniture support, comprising a socket element, a floor engaging element including a pintle adapted to be inserted and removed with respect to said socket element, resilient means cooperating between said socket element and said floor engaging element adapted to be compressed under a load on said support and to exert an expelling force on said floor engaging element, said pintle having a relative inward movement with respect to said socket element under said compression, said pintle having an annular groove, a spring ring loosely disposed in said groove and being relatively narrower than said groove to an extent substantially corresponding to the relative compression movement of said pintle, said ring adapted to frictionally grip the inner surface of said socket element and permit free axial and rotary movement between said elements, said ring abutting the lower wall of said groove during insertion of the pintle in the socket, and adapted upon the initial compression after insertion to be moved to its normal pintle retaining position in relation to the upper wall of said groove.

5. A compensating furniture support, comprising a socket element having a top bearing portion, a floor engaging element including a pintle having rotary and vertical reciprocatory movement in said socket element, means constituting a stop to limit the downward movement of said pintle, said top bearing portion of the socket element constituting a limit stop for the upward movement, a separately formed axial bearing element functionally interposed between said pintle and said bearing portion of the socket element and in respect to which said pintle has relative movement, resilient means engaging said bearing element and through said bearing element exerting a downward pressure on said pintle toward said limiting stop, said bearing element providing an axially resilient swivel contact bearing for said pintle in all positions of said pintle between its limits of reciprocation under varying limited loads, and providing a non-resilient swivel contact bearing independently of said resilient means between said pintle and said top bearing portion of the socket element under a predetermined load.

6. A compensating furniture support, comprising a socket element having a top bearing portion, a floor engaging element including a pintle having rotary and vertical reciprocatory movement in said socket element, a pintle retaining member functionally connected to said socket element, a stop on said pintle for limiting its downward movement through engagement with said retaining member, said top bearing portion of the socket element constituting a limit stop for the upward movement, a separately formed axial bearing element functionally interposed between said pintle and said socket element, resilient means engaging said bearing element and through said bearing element exerting a downward pressure on said pintle toward said pintle retaining member whereby said stop on said pintle is yieldingly held in contact with said pintle retaining member to limit the axial motion between the pintle and the socket when the floor engaging element is out of contact with the floor, said bearing element providing a resilient bearing for said pintle in all positions of said pintle between its limits of reciprocation under varying limited loads, said pintle being non-resiliently supported independently of said resilient means by said top bearing portion of the socket element under a predetermined load.

In testimony whereof, I have signed my name to this specification, this 25th day of July, 1930.

WALTER F. HEROLD.